United States Patent
Wang et al.

(10) Patent No.: US 7,054,006 B2
(45) Date of Patent: May 30, 2006

(54) SELF-CALIBRATING BEAM PROFILE ELLIPSOMETER

(75) Inventors: Haiming Wang, Fremont, CA (US); Jeffrey T. Fanton, Los Altos, CA (US); Lanhua Wei, Fremont, CA (US)

(73) Assignee: Therma-Wave, Inc., Fremont, CA (US)

( * ) Notice: Subject to any disclaimer, the term of this patent is extended or adjusted under 35 U.S.C. 154(b) by 79 days.

(21) Appl. No.: 10/782,321

(22) Filed: Feb. 19, 2004

(65) Prior Publication Data

US 2004/0233436 A1 Nov. 25, 2004

Related U.S. Application Data

(60) Provisional application No. 60/471,915, filed on May 20, 2003.

(51) Int. Cl.
*G01N 21/00* (2006.01)
(52) U.S. Cl. ..................................................... 356/369
(58) Field of Classification Search .................. 356/369
See application file for complete search history.

(56) References Cited

U.S. PATENT DOCUMENTS

| | | | |
|---|---|---|---|
| 3,687,555 A * | 8/1972 | Yamamoto et al. | 356/365 |
| 4,999,014 A | 3/1991 | Gold et al. | 356/382 |
| 5,042,951 A | 8/1991 | Gold et al. | 356/369 |
| 5,181,080 A | 1/1993 | Fanton et al. | 356/381 |
| 5,373,359 A | 12/1994 | Woollam et al. | 356/328 |
| 5,412,473 A | 5/1995 | Rosencwaig et al. | 356/351 |
| 5,504,582 A | 4/1996 | Johs et al. | 356/369 |
| 5,521,706 A | 5/1996 | Green et al. | 356/369 |
| 5,596,411 A | 1/1997 | Fanton et al. | 356/369 |
| 5,666,201 A | 9/1997 | Johs et al. | 356/369 |
| 5,757,494 A | 5/1998 | Green et al. | 356/369 |
| 5,835,222 A | 11/1998 | Herzinger | 356/369 |
| 5,872,630 A | 2/1999 | Johs et al. | 356/369 |
| 5,877,859 A | 3/1999 | Aspnes et al. | 356/364 |
| 5,956,145 A | 9/1999 | Green et al. | 356/364 |
| 6,034,777 A | 3/2000 | Johs et al. | 356/369 |
| 6,256,097 B1 * | 7/2001 | Wagner | 356/369 |
| 6,304,326 B1 | 10/2001 | Aspnes et al. | 356/369 |
| 6,320,657 B1 * | 11/2001 | Aspnes et al. | 356/369 |
| 6,353,477 B1 | 3/2002 | Johs et al. | 356/369 |
| 6,429,943 B1 | 8/2002 | Opsal et al. | 356/625 |
| 6,678,046 B1 * | 1/2004 | Opsal | 356/369 |
| 6,784,991 B1 * | 8/2004 | Rotter et al. | 356/369 |

* cited by examiner

Primary Examiner—Gregory J. Toatley, Jr.
Assistant Examiner—Isiaka O. Akanbi
(74) Attorney, Agent, or Firm—Stallman & Pollock LLP

(57) ABSTRACT

A real-time calibration method for beam profile ellipsometry systems includes projecting an electromagnetic probe beam having a known polarization state though an objective lens onto the surface of a subject and collecting the reflected probe beam using the same objective. The reflected probe beam is then passed through a rotating compensator and analyzer before being received by a detector. A processor performs a harmonic analysis on the detector output to determine normalized Fourier coefficients. The processor uses Fourier coefficients to measure the retardation $\delta_B$ and the azimuth angle $Q_B$ of the objective lens; and uses the retardation $\delta_B$ and the azimuth angle $Q_B$ to identify the ellipsometric effects of the objective lens.

14 Claims, 1 Drawing Sheet

SELF-CALIBRATING BEAM PROFILE ELLIPSOMETER

PRIORITY

This application claims priority from U.S. Provisional Application Ser. No. 60/471,915, filed May 20, 2003, the disclosure of which is incorporated herein by reference.

TECHNICAL FIELD

The subject invention relates generally to optical methods for inspecting and analyzing semiconductor wafers and other samples. In particular, the subject invention relates to methods for increasing the accuracy of an ellipsometer by separating the ellipsometric parameters related to the sample from those related to the focusing optical elements.

BACKGROUND OF THE INVENTION

As geometries continue to shrink, manufacturers have increasingly turned to optical techniques to perform non-destructive inspection and analysis of semiconductor wafers. Techniques of this type, known generally as optical metrology, operate by focusing an optical beam on a sample and then analyzing the reflected energy. Spectroscopic ellipsometer (SE) is a widely used form of optical metrology that is particularly useful for analyzing multilayer film stacks formed on semiconductor wafers. Briefly, ellipsometry measures polarization properties of a sample, commonly termed "ellipsometric parameters." These ellipsometric parameters are defined as the ratio of magnitudes and difference of phase for light of two orthogonal polarization states, commonly referred to as s-polarized and p-polarized light. By measuring these ellipsometric parameters over a broadband of spectrum spreading from deep ultraviolet (DUV) to near infrared (NIR), SE can determine thicknesses and CDs of multiplayer film stacks.

As the geometries used in semiconductors continue to decrease, optical metrology tools are forced to analyze smaller and smaller structures. For most optical metrology systems, this means using smaller measurement spots (the area within a subject that the detected light originates from during measurement). At the same time, it is not always practical to reduce measurement size, particularly for ellipsometers. This is partially because ellipsometers, unlike reflectometers, are typically configured to operate at non-normal angles of incidence. The non-normal angle of incidence increases sensitivity to thin-film properties. At the same time, non-normal incidence elongates the measurement spot by a factor equal to $1/\cos(\theta)$ where $\theta$ is the angle of incidence. For an incident angle of seventy-degrees, for example, this elongation means that the measurement spot is spread to nearly three times its normal length.

Chromatic aberration is a second obstacle that often limits reductions in measurement spot sizes for ellipsometers. Chromatic aberration results when an optical system transports light in a wavelength dependent fashion. In spectral ellipsometers, the probe beam includes a range of wavelengths and chromatic aberration tends to create different measurement spot sizes for the different probe beam wavelengths. This is particularly true for spectral ellipsometers that use diffractive optical elements. The overall result is that the minimum size of the measurement spot is influenced by the range of wavelengths included in the probe beam and the amount of chromatic aberration present of the spectral ellipsometer.

As shown in FIG. 1, one approach for reducing measurement spot sizes in ellipsometers is to use normal incidence in combination with a high numerical aperture objective. The use of the high numerical aperture objective increases the accuracy with which the measurement spot may be imaged. The high numerical objective also creates a spread of angles of incidence all converging on a relatively small illumination spot. The angles of incidence can range up to 70 degrees where a numerical aperture of 0.95 is used. For a more typical case, a numerical aperture of 0.9 is used and the angles of incidence are as high as 64 degrees. In either case, the multiple angle of incidence approach provides an enhanced ability to deduce thin film properties while still maintaining a small measurement spot size.

Systems of the type shown in FIG. 1 are generally referred to as Beam Profile Ellipsometers (BPEs) and are described in more detail in U.S. Pat. Nos. 5,596,411, 5,877,859, 4,999,014, 5,042,951, 5,181,080, 5,412,473, 5,596,406, 6,304,326, and 6,429,943 (the disclosure of each of these documents is incorporated by reference).

In practice, there are a number of obstacles that must be overcome to optimize BPE performance for small measurements spot sizes. One of these is separation of the ellipsometric parameters related to the sample from those related to the focusing optical elements. This problem arises because the optical components that direct the probe beam within an ellipsometer have their own ellipsometric parameters. These parameters must be distinguished from the ellipsometric parameters of the sample before accurate measurements may be made. For BPE systems, separation is difficult to achieve because the objective lens is used for both illumination and imaging and must, as a result, be placed in close proximity to the sample. The nearness in proximity means that the ellipsometric parameters related to the sample cannot be separated from those contributed by the objective.

An obvious approach is to attempt to reduce or minimize the contribution of the objective to the measured ellipsometric parameters. In practice, this turns out to be a difficult goal to achieve. One reason for this is the size and complexity of the high numerical aperture objective. Mounting this lens in a stress free fashion is not generally possible. Temperature fluctuations and air turbulence (often caused by wafer movements) induce additional stress on the objective. Stress causes the crystalline lattice of the objective to deform making the objective birefringent (i.e., the objective exhibits different refractive indices for s-polarized and p-polarized light). The birefringence changes as components expand, contract or move in response to heat, turbulence and other stresses.

One method for reducing birefringence-induced effects is to align the polarization direction of the incident beam parallel to one of the axes (either the fast or the slow axis) of the birefringent component. This scheme, however, cannot be easily implemented to solve the objective effects. There are two issues here: 1) the orientation of the stress changes as the environment perturbations are random in nature, and 2) even given the orientation of the stress, its effects can only be eliminated from the incident beam. The beam reflected from the sample is usually elliptically polarized, and thus will be inevitably affected by the objective no matter which orientation of the stress.

Another method for reducing birefringence-induced effects is to calibrate using a set of standard wafers with known structures. In practice, calibration with standard wafers only works if the wafers are first characterized using a tool that has a higher accuracy that the ellipsometer being calibrated. This characterization must be repeated periodically as matter accumulates on the surface of the standard wafers. The process of characterization is expensive and time consuming (especially when repeated) and, in practice, may not be convenient or cost effective. Calibration also creates many cycles of wafer movements as sample wafers. Typically, this means that the sample wafers are first removed to standard wafers to be loaded. One or more standard wafers are then loaded and unloaded in succession followed by reloading of the sample wafer. This not only reduces throughput, but also creates air turbulence during measurements. Because the objective in BPE systems is highly sensitive to environment perturbations, these repeated wafer movements often lead to calibration errors.

Based on the preceding description, it is clear that there is a need for methods that increase ellipsometer accuracy by separating the ellipsometric parameters related to the sample from those related to the focusing optical elements. This is increasingly important as design rules for semiconductor wafers continue to shrink and is increasingly important for measuring multiple films within multilayer film stacks.

DETAILED DESCRIPTION OF THE PREFERRED EMBODIMENTS

Figure 1:
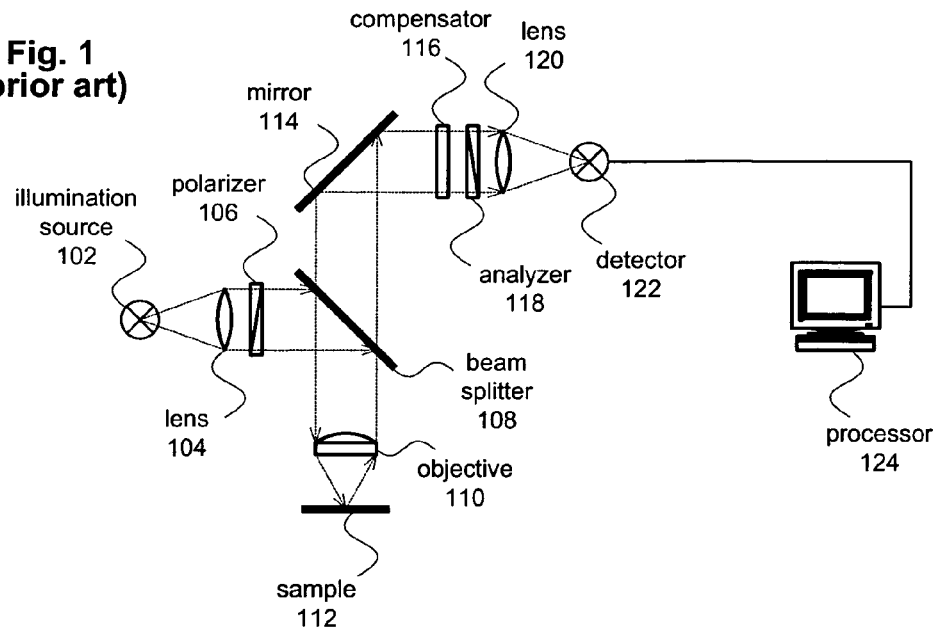
FIG. 1 is a block diagram of a prior art ellipsometry system.

The present invention provides a real-time calibration method for beam profile ellipsometry systems. The calibration method increases ellipsometer accuracy by separating the ellipsometric parameters related to the sample from those related to the focusing optical elements. FIG. 1 shows an ellipsometer 100 suitable for use with the calibration method. As show in FIG. 1, ellipsometer 100 includes an illumination source 102 that produces a polychromatic or monochromatic probe beam. In some cases, illumination source will include one or more separate illumination sources that are combined or multiplexed in time to create the probe beam. After leaving illumination source 102, the probe beam is focused by a lens 104 and passed through a polarizer 106. Polarizer 106 imparts a known polarization state to the probe beam. Polarizer 106 may be, for example, a quartz Rochon prism, but in general the polarization does not necessarily have to be linear, or even complete. Polarizer 106 may be made of any of a variety of materials. The azimuth angle of polarizer 106 is oriented so that the plane of the electric vector associated with the linearly polarized beam exiting from the polarizer 106 is at a known angle with respect to the plane of incidence (defined by the propagation direction of the beam 114 and the normal N to the exposed surface of the sample 102). For embodiments where illumination source 102 emits polarized light, polarizer 106 may be omitted.

The probe beam is the redirected by a beam splitter 108 and focused by an objective 110 before reaching a sample 112. As discussed previously, objective 110 is inherently birefringent and the degree of birefringence varies over time. After being reflected by sample 112, the probe beam is imaged by objective 110 and directed (for this implementation) to a mirror 114. Mirror 114 directs the probe beam through a rotating compensator 116. Rotating compensator 116 introduces a relative phase delay δ (phase retardation) between a pair of mutually orthogonally polarized optical beam components. The amount of phase retardation is a function of the wavelength, the dispersion characteristics of the material used to form compensator 116, and the thickness of the compensator 116. Compensator 116 is rotated at an angular velocity ω about an axis substantially parallel to the propagation direction the probe. When used herein, rotation is intended to include continuous rotation, as well as rotation in increments or steps.

After leaving rotating compensator 116, the probe beam passes through an analyzer 118 that serves to mix the polarization states incident on it. Analyzer 118 may be, for example, a linear polarizer oriented at an azimuth angle of 45° relative to the plane of incidence. However, any optical device that serves to appropriately mix the incoming polarization states can be used as an analyzer.

It should be noted that compensator 116 can be located either between the sample 112 and the analyzer 118 (as shown in FIG. 1), or between the polarizer 106 and the sample 112. If compensator 116 is located between sample 112, and analyzer 118, compensator 116 may be held fixed and analyzer 118 rotated. On the other hand, if the compensator is located between polarizer 106 and sample 112, compensator 116 may be held fixed and polarizer 110 rotated.

After leaving analyzer 118, the probe beam is focused by a lens 120 before reaching a detector 122. Detector 122 is subdivided into four quadrants. The output of each quadrant is forwarded to a processor 124 for analysis. Processor 124 uses the output of detector 122 to determine the polarization state of the probe beam, and in turn, the ellipsometric parameters of the sample. In cases where a polychromatic probe beam is used, or where different probe beams are multiplexed in time, the analysis process is performed as a function of wavelength. The analysis is also performed as a function of the azimuth (rotational) angle of compensator 116 about its axis of rotation. Because a quad cell is used to record the detector signals, eight harmonic coefficients are obtained for each measurement. This is functionally equivalent to two ellipsometers simultaneously measuring the same sample: one corresponding to quads one and three, and the other corresponding to quads two and four.

In general, it should be appreciated that the description of ellipsometer 100 is intended to be general in nature. Numerous variations and substitutions are possible for the individual components of ellipsometer 100 including the use of reflective components in place of the refractive components shown. As will become clear, the real-time calibration method is intended to be useful in combination with any BPE-type system or any system where the probe beam is both focused on the sample, and imaged from the sample using a single optical subsystem.

For the calibration method, the effects of objective 110 are described by an equivalent waveplate, with a retardation and orientation of the fast or slow axes. To describe the equivalent waveplate, it is convenient to use the three dimensional coordinate system shown in FIG. 2. Within this x, y, z coordinate space, the x-y plane is parallel to objective 110. This means that that z-axis is perpendicular or normal to objective 110. Furthermore, the x and y axes are in conjugation to the x and y axes in the plane of the quad cell detector.

Figure 2:
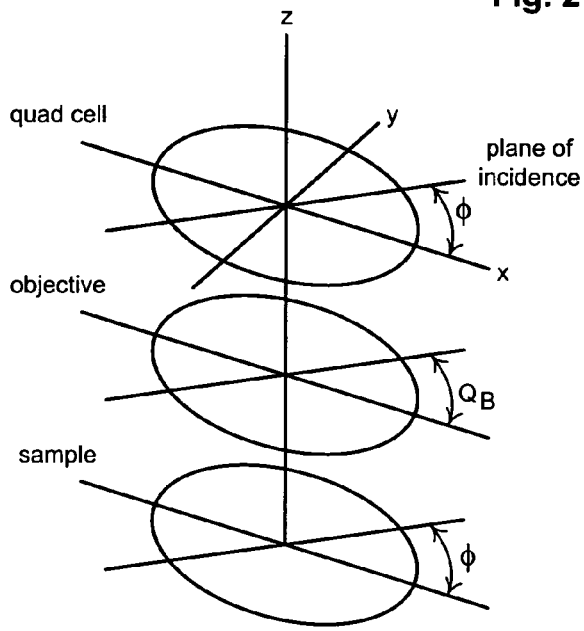
FIG. 2 is a diagram showing the fast or slow axis of a polarized field at the field impinges upon an objective lens, a detector and a sample under study.

As shown in FIG. 2, the fast or slow axis of the equivalent waveplate makes an angle $Q_B$ to the x-axis. The retardation of the equivalent waveplate is denoted $\delta_B$ (not shown in FIG.

2). In FIG. 2, it is shown that the polarization state of the light emerging from the objective is determined by the relative angular positions of the plane of the incidence and the azimuth angle of the equivalent waveplate, $Q_B$. Consider one specific beam falling onto the objective in quad one with azimuth angle $\phi$ and angle of incidence (AOI), $\theta$. The beam is reflected by the sample and will then emerge from quad three. In this propagation process, the beam will "see" a phase shift between the s-polarized and p-polarized light due to the equivalent waveplate. The phase shift may be expressed using the following Jones matrix:

$$J_{Objective} = \begin{bmatrix} \cos Q_B & -\sin Q_B \\ \sin Q_B & \cos Q_B \end{bmatrix} \begin{bmatrix} e^{i\delta_B} & 0 \\ 0 & 1 \end{bmatrix} \begin{bmatrix} \cos Q_B & \sin Q_B \\ -\sin Q_B & \cos Q_B \end{bmatrix}$$

Importantly, $J_{Objective}$ is completely determined by $\delta_B$ (the retardation of the equivalent waveplate) and $Q_B$ (the azimuth angle of the equivalent waveplate). $J_{Objective}$ is independent of $\phi$ (the azimuth angle of the incidence plane) because the equivalent waveplate (i.e., objective 110) is placed in a collimated beam.

On the other hand, the reflection from the sample surface will introduce both phase shift and amplitude modification to the incoming beam. If the sample is isotropic, then the beam falling onto it can always be decomposed into a linear combination of two orthogonally polarized components, the s-polarized and p-polarized components. The reflection coefficients for the light of these two polarization states depends only on the angle $\theta$, the AOI, while the azimuth angle $\phi$ affects how the incoming light is decomposed. Again using the Jones matrix, one can express the effects of the sample reflection, at the given azimuth orientation of the plane of incidence, by $$J_{Sample} = \begin{bmatrix} \cos\phi & -\sin\phi \\ \sin\phi & \cos\phi \end{bmatrix} \begin{bmatrix} \tan\psi e^{i\delta} & 0 \\ 0 & 1 \end{bmatrix} \begin{bmatrix} \cos\phi & \sin\phi \\ -\sin\phi & \cos\phi \end{bmatrix}$$

where $\tan\psi$ and $\delta$ are the ellipsometric parameters of the sample at AOI=$\theta$, which are independent of the azimuth angle $\phi$. When the quad cells within detector 122 accumulate the light passed by analyzer 118, they will integrate all the photo-current corresponding to $0 \leq \phi < 90°$ for quad one, $90 \leq \phi < 180°$ for quad two, $180 \leq \phi < 270°$ for quad three, and $270 \leq \phi < 360°$ for quad four, respectively. The periodic nature of the sine and cosine components means that quads one and three will receive the same integrated photo-current. The same is true for quads two and four. Furthermore, for all four quads, the range of the integration over the AOI (the angle $\theta$) is determined by the NA of objective 110. For NA=0.9, this integration is over the range: $0 \leq \theta \leq 64.16°$.

Comparison of the two Jones matrices indicates that it is possible to distinguish between phase effects created by the sample and phase effects created by objective 110. This follows because the phase effects created by objective 110 are constant over all quads. The phase effects created by the sample, on the other hand, are different when measured in quads one and three than they are when measured in quads two and four.

The basic cause for the separation of sample and objective effects is the preferred orientation of the equivalent waveplate, the angle QB. In BPE or in other type of ellipsometers, it is possible to combine the objective and the sample as an "equivalent sample," whose ellipsometric parameters the ellipsometer finally measures. In conventional ellipsometer, the detector will accumulate the photo-current over the azimuth angle range from zero to 360 degrees. There is no means to separate the contributions from the sample from the objective with one measurement. On the other hand, in BPE, because of the high NA objective and because quad cell detection scheme, and because of the preferred orientation of the objective, quads one and three will see one combination of the objective and sample, while quads two and four see another combination. By comparing the detector signals of quads one and three to the detector signals from quads two and four, it is possible to determine both the contributions of the sample and the objective from two sets of their combinations. In fact, there is only one situation under which these two kinds of effects cannot be separated anymore. That case occurs when the environment induced stress on the objective is rotationally symmetric, while the sample is isotropic. Under these conditions, the objective cannot be represented by an equivalent waveplate. At any plane of the incidence, the combination of the objective and the sample is always the same.

To separate the effects of the sample from those related to the objective lens, three independent variables must be resolved: 1) the thickness of the film being measured, 2) the retardation $\delta_B$ of objective 110, and 3) azimuth angle $Q_B$ of objective 110. In traditional BPE type systems, only two independent data are measured for each given wavelength. These are sum-signal corresponding to the total photo-current of all four quads, and the diff-signal corresponding to the difference between the signal from quads one and three from that from quads two and four. The use of rotating compensator 116 (in place of the more common fixed compensator) allows ellipsometry system 100 to acquire eight independent harmonic coefficients at a specific wavelength. The eight harmonic coefficients can be used, in turn to resolve the three independent variables. Preferably, this is accomplished using Mueller calculus to track the optical system backwards, starting at detector 120 and ending at illumination source 102. Mueller calculus for ellipsometry is discussed in: R. M. A. Azzam and N. M. Bashara, *Ellipsometry and Polarized Light*, Elsevier, Amsterdam, 1996, and D. S. Kliger, J. W. Lewis, and C. E. Randall, *Polarized Light in Optics and Spectroscopy*, Academic Press, Boston, 1990.

In a preferred approach, the processor can perform a harmonic analysis on the output signal from the detector to determine normalized Fourier coefficients corresponding to 2 $\omega$ and 4 $\omega$ components that are included in the output signal. The Fourier coefficients are used to measure the retardation $\delta_B$ and the azimuth angle $Q_B$ of the objective lens. As noted above, the retardation $\delta_B$ and the azimuth angle $Q_B$ are used to measure and eliminate the ellipsometric effects of the objective lens.

Figure 3:
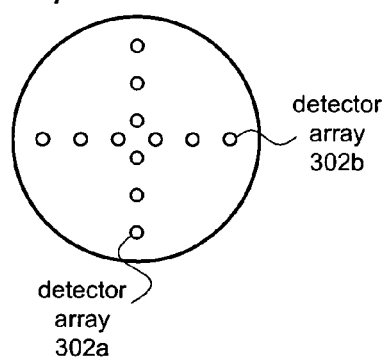
FIG. 3 is a block diagram of a prior art detector as used in a beam profile ellipsometer.

For the embodiment described above, a quad-cell detector is used in combination with a rotating compensator to differentiate between effects of the sample and effects of the objective lens. In practice, the same techniques may be used even where other detector types are employed. For example, U.S. Pat. No. 5,042,951 discloses an angle-resolved BPE system that uses a detector that includes individually addressable elements. As shown in FIG. 3, a typical implementation for this detector includes two linear detector arrays 302a and 303b. Detectors arrays 302 are typically oriented perpendicularly to each other to provide coverage in two dimensions. The output of detector arrays 302 is typically accessible on an element-by-element basis. This makes it possible, for example, to separately access the output of the topmost element of detector array 302a or the leftmost element of detector array 302b.

Individual elements within detector arrays 302 map to different angles of incidence (AOI=θ) with outer elements corresponding to greater angles of incidence. For the example of FIG. 3, the leftmost and rightmost elements of detector array 302a correspond to a large angle of incidence. At locations closer to the center of the detector, the elements correspond to increasingly smaller values of θ.

For the detector shown in FIG. 3, the ellipsometric parameters of the sample and the ellipsometric parameters of the objective lens have the same behavior with respect to azimuth angle φ as described in the quad-cell BPE. The only difference is that in the quad cell approach the light is averaged over an entire quadrant of the beam, while in the angle-resolved approach it is not. The additional information collected by introducing a rotating compensator is fundamentally the same. Again, the only difference is whether or not the signal is averaged over a quadrant. As a result, the mathematical algorithm for separating the sample and the ellipsometric parameters of the objective lens parallels the case described for the quad cell detector, with the exception that the integration over the quadrant is not required.

What is claimed is:

1. An ellipsometer for optically inspecting a subject, the apparatus comprising:
   a source for generating an electromagnetic probe beam having a known polarization state;
   an objective lens for focusing the probe beam on the surface of the subject, the objective lens also collecting the probe beam after it has been reflected by the subject;
   a rotating compensator for inducing phase retardations in the polarization state of the probe beam;
   an analyzer positioned to interact with the probe beam;
   a detector for measuring the intensity of the probe beam after the interaction with the analyzer, said detector being subdivided to provide eight coefficients for measuring the retardation $\delta_B$ and the azimuth angle $Q_B$ of the objective lens;
   a processor for evaluating the sample based on the outputs of the detector, the processor configured to perform a harmonic analysis on the output signal from the detector to determine normalized Fourier coefficients corresponding to 2ω and 4ω components that are included in the output signal;
   use the Fourier coefficients to measure the retardation $\delta_B$ and the azimuth angle $Q_B$ of the objective lens; and
   use the retardation $\delta_B$ and the azimuth angle $Q_B$ to measure and eliminate the ellipsometric effects of the objective lens.

2. An ellipsometer comprising:
   a light source for generating a probe beam of radiation
   an optical element for focusing the probe beam substantially normal to the surface of the sample such that various rays within the focused probe beam create a spread of angles of incidence;
   a rotating compensator for retarding the phase of one polarization state in the probe beam with respect to the phase of the other polarization state in the probe beam;
   a polarizer for creating interference between the two polarization states in the probe beam after the probe beam has been reflected from the surface of the sample;
   a quadrant detector for measuring the power of the reflected probe beam after it has passed through the retarding and polarizing means, each said quadrant of the detector generating an output that integrates the intensity of various rays having different angles of incidence, and
   a processor for analyzing the output of the four quadrants based on measurements taken when the compensator is in two different azimuthal positions in order to determine the changes in the phase in the probe beam induced by the focusing optical element.

3. An ellipsometer for evaluating a sample comprising:
   a light source for generating a monochromatic, polarized probe beam;
   optics for directing the probe beam normal to the sample surface;
   an objective for focusing the probe beam onto the sample surface in a manner to create a spread of angles of incidence, said objective also collecting the probe beam after it has been reflected by the sample;
   a photodetector positioned to monitor the probe beam after reflection from the sample and having detecting regions for generating separate output signals along at least two orthogonal axes;
   an analyzer positioned between the sample and the photodetector;
   a compensator positioned between the light source and the analyzer with one of said analyzer and compensator being rotatable; and
   a processor for evaluating characteristics of the sample based on the output signals with said evaluation including accounting for the polarization effects induced by the objective.

4. An ellipsometer as recited in claim 3, wherein said processor accounts for the polarization effects induced by the objective by treating the objective as an equivalent waveplate having a particular azimuthal angle and retardation value.

5. An ellipsometer as recited in claim 3, wherein the photodetector is a quad cell.

6. An ellipsometer as recited in claim 3, wherein the photodetector includes a two dimensional array of photodetector elements.

7. An ellipsometer as recited in claim 3, wherein the output signals along one axis are compared to the output signals along the remaining axis in order to account for the polarization effects induced by the objective.

8. An ellipsometer as recited in claim 3, wherein the compensator is moved between two orthogonal positions to obtain to separate measurements.

9. A method of evaluating a sample comprising the steps of:
   focusing a polarized monochromatic probe beam onto the surface of a sample with an objective in a manner to create a spread of angles of incidence;
   collecting the probe beam after reflection from the sample with the objective;
   measuring the collected probe beam with a detector that generates output signals along two orthogonal axes, said measuring step being performed after the probe beam passes through a compensator and an analyzer;
   changing the azimuthal angle of one of the compensator and analyzer to obtain a second measurement; and
   evaluating the sample based on the output signals, said evaluation step including accounting for the polarization effects induced by the objective.

10. A method as recited in claim 9, wherein the objective is treated as an equivalent waveplate at a particular azimuthal angle and retardation value.

11. A method as recited in claim 9, wherein the photodetector is a quad cell.

12. A method as recited in claim 9, wherein the photodetector includes an two dimensional array of photodetector elements.

13. A method as recited in claim 9, wherein the output signals along one axis are compared to the output signals along the remaining axis in order to account for the polarization effects induced by the objective.

14. A method as recited in claim 9, wherein the azimuthal angle of the compensator is changed between two orthogonal positions to obtain the two measurements.

* * * * *